US009092640B2

(12) United States Patent
Domany et al.

(10) Patent No.: US 9,092,640 B2
(45) Date of Patent: Jul. 28, 2015

(54) ACCESS CONTROL FOR SERVER APPLICATIONS

(75) Inventors: Tamar Domany, Haifa (IL); Ksenya Kveler, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 12/942,038

(22) Filed: Nov. 9, 2010

(65) Prior Publication Data

US 2012/0117660 A1    May 10, 2012

(51) Int. Cl.
| | |
|---|---|
| G06F 21/00 | (2013.01) |
| G06F 21/62 | (2013.01) |
| G06F 21/32 | (2013.01) |
| G06F 21/31 | (2013.01) |
| H04L 29/06 | (2006.01) |
| H04L 9/32 | (2006.01) |
| H04L 9/08 | (2006.01) |

(52) U.S. Cl.
CPC ............ *G06F 21/6218* (2013.01); *G06F 21/31* (2013.01); *G06F 21/32* (2013.01); *H04L 9/0897* (2013.01); *H04L 9/321* (2013.01); *H04L 63/083* (2013.01); *H04L 63/0815* (2013.01); *H04L 63/0823* (2013.01)

(58) Field of Classification Search
CPC . G06F 21/60; G06F 21/62; G06F 2221/2141; G06F 21/32; G06F 2221/2115; G06F 21/31; H04L 63/08; H04L 63/04; H04L 9/0897; H04L 9/321; H04L 9/3271; H04L 63/0861; H04L 9/3231; H04L 63/083; H04L 63/0815; H04L 63/0823

USPC ...................................................... 726/26–28
See application file for complete search history.

(56) References Cited

U.S. PATENT DOCUMENTS

| | | | |
|---|---|---|---|
| 6,014,666 A | 1/2000 | Helland et al. | |
| 6,317,868 B1 | 11/2001 | Grimm et al. | |
| 6,728,884 B1 | 4/2004 | Lim | |
| 7,616,764 B2 * | 11/2009 | Varghese et al. | 380/255 |
| 8,571,319 B2 * | 10/2013 | Balasubramanian et al. | 382/176 |
| 2002/0157023 A1 | 10/2002 | Callahan et al. | |
| 2006/0005247 A1 * | 1/2006 | Zhang et al. | 726/26 |
| 2006/0075228 A1 * | 4/2006 | Black et al. | 713/167 |
| 2006/0200066 A1 * | 9/2006 | Fischer | 604/20 |
| 2007/0300306 A1 * | 12/2007 | Hussain | 726/27 |
| 2008/0162603 A1 * | 7/2008 | Garg et al. | 707/204 |

(Continued)

OTHER PUBLICATIONS

Gavrila and Barkley, "Formal Specification for Role Based Access Control User/Role and Role/Role Relationship Management," (Oct. 1998).

(Continued)

*Primary Examiner* — Mohammad A Siddiqi

(57) ABSTRACT

A method, system, and computer program product for access control for a server application provided between a server executing an application and a client. Access control is added to an existing server application (for example, a legacy application) without changing the application or the database. The method includes: capturing a screen from the server application; determining if the screen includes sensitive content; and checking a client user's authorization before sending a screen including sensitive content to the client. Determining if the screen includes sensitive content may include: carrying out text recognition on the screen content; and analyzing the output of the text recognition to identify sensitive content.

20 Claims, 8 Drawing Sheets

(56) References Cited

U.S. PATENT DOCUMENTS

| | | | |
|---|---|---|---|
| 2009/0089869 A1* | 4/2009 | Varghese | 726/7 |
| 2010/0024037 A1* | 1/2010 | Grzymala-Busse et al. | 726/26 |
| 2010/0046015 A1* | 2/2010 | Whittle et al. | 358/1.9 |
| 2010/0074525 A1 | 3/2010 | Drory et al. | |
| 2011/0239306 A1* | 9/2011 | Avni et al. | 726/26 |

OTHER PUBLICATIONS

Barkley, "Application Engineering in Health Care", pp. 1-7 (May 9, 1995).

~ and Ferraiolo, "Role Based Access Control Slide Set", May 1995, National Institute of Standards and Technology (1995).

Charles L. Smith Sr. et al., "A Marketing Survey of Civil Federal Government Organizations to Determine the Need for a Role-Based Access Control (RBAC) Security Product," Seta Corporation (Jul. 1996).

Ferraiolo and Barkley, "Specifying and Managing Role-Based Access Control within a Corporation Intranet" (1997).

Ferraiolo et al., "Role-Based Access Control (RBAC): Features and Motivations" (1995).

Barkley, "Comparing Simple Role Based Access Control Models and Access Control Lists," (1997).

Disclosed Anonymously, "Automatic application screen identification based on screen image", IBM Jun. 13, 2010.

Richard Kuhn, "Mutual Exclusion of Roles as a Means of Implementing Separation of Duty in Role-Based Access Control Systems" (1997).

* cited by examiner

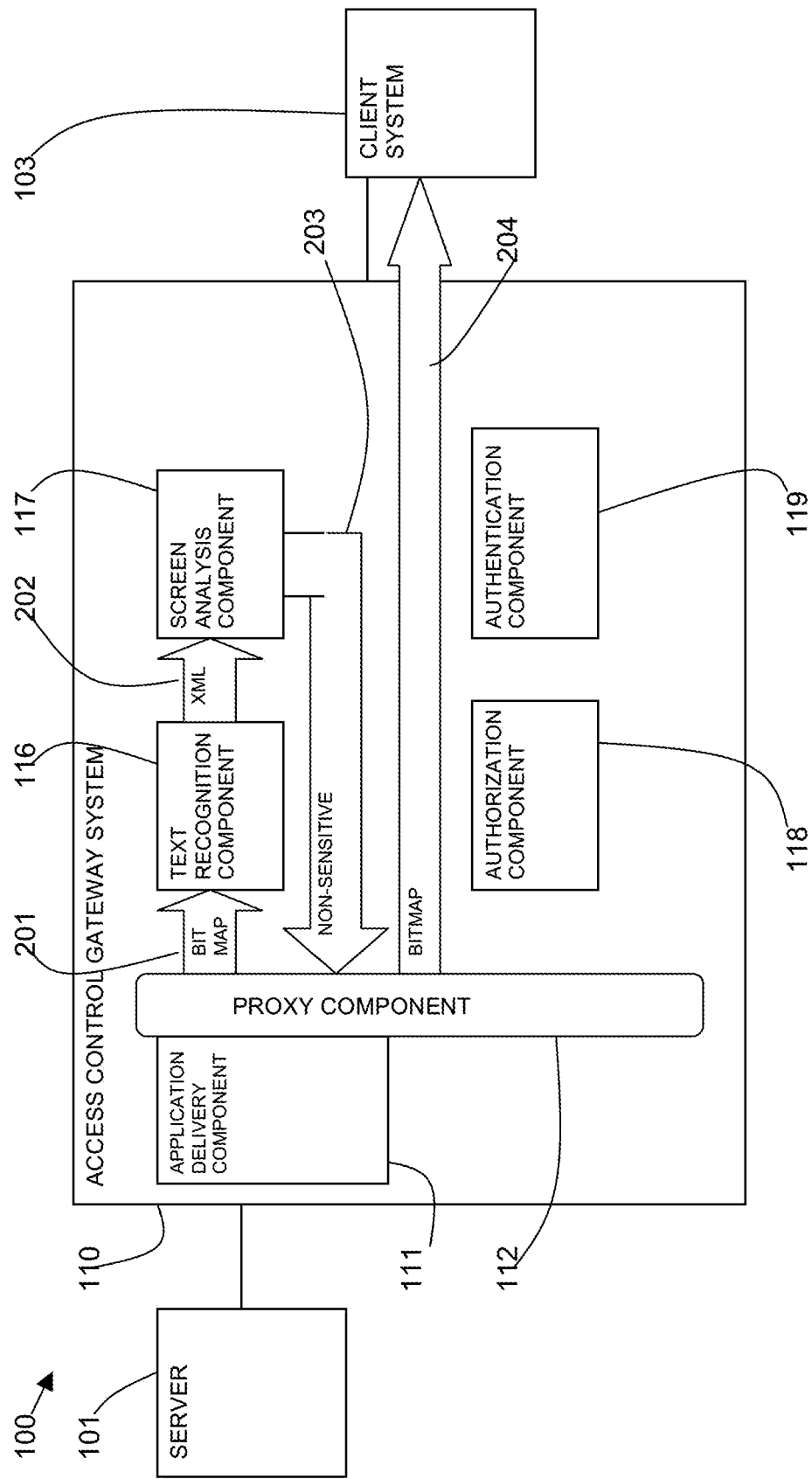

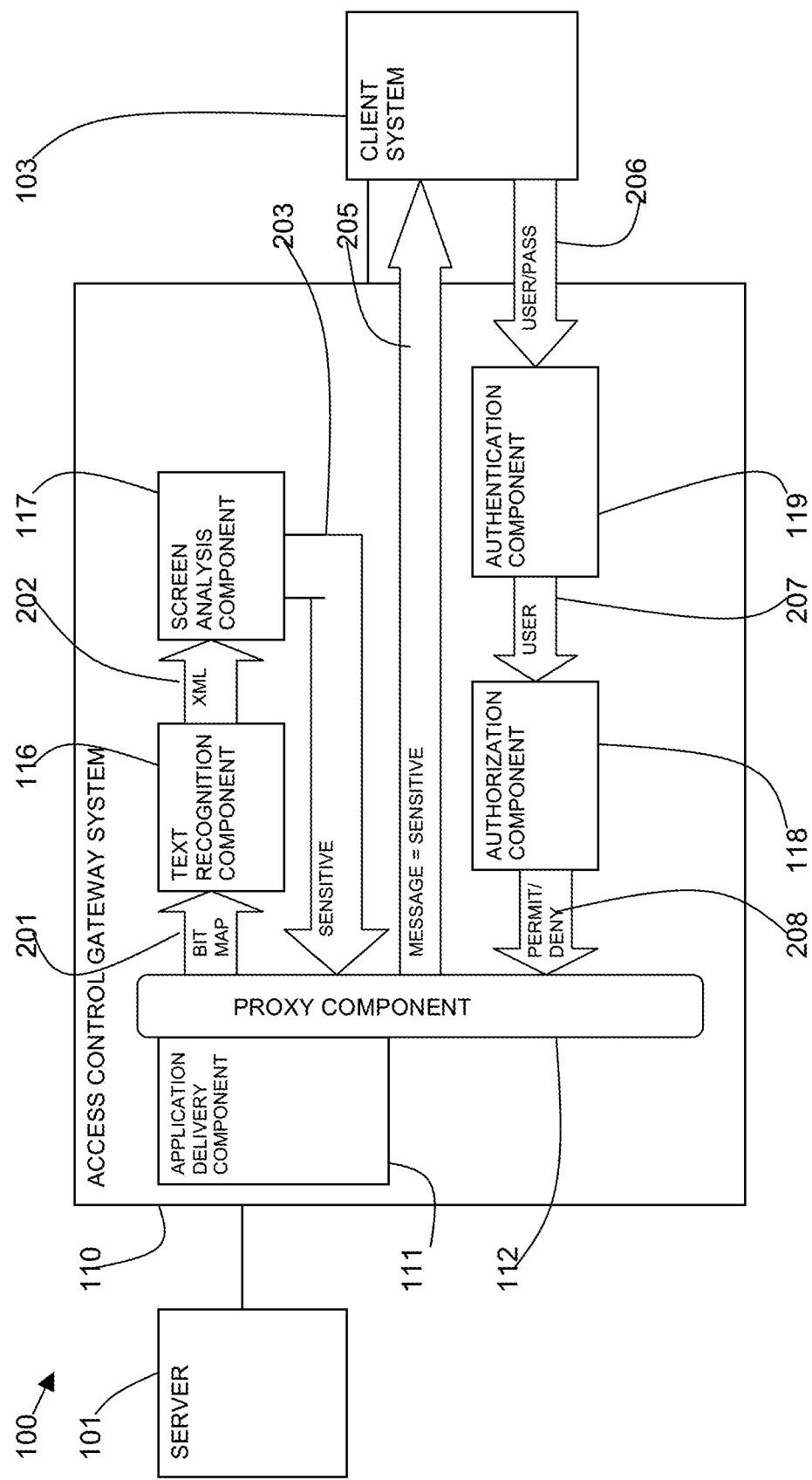

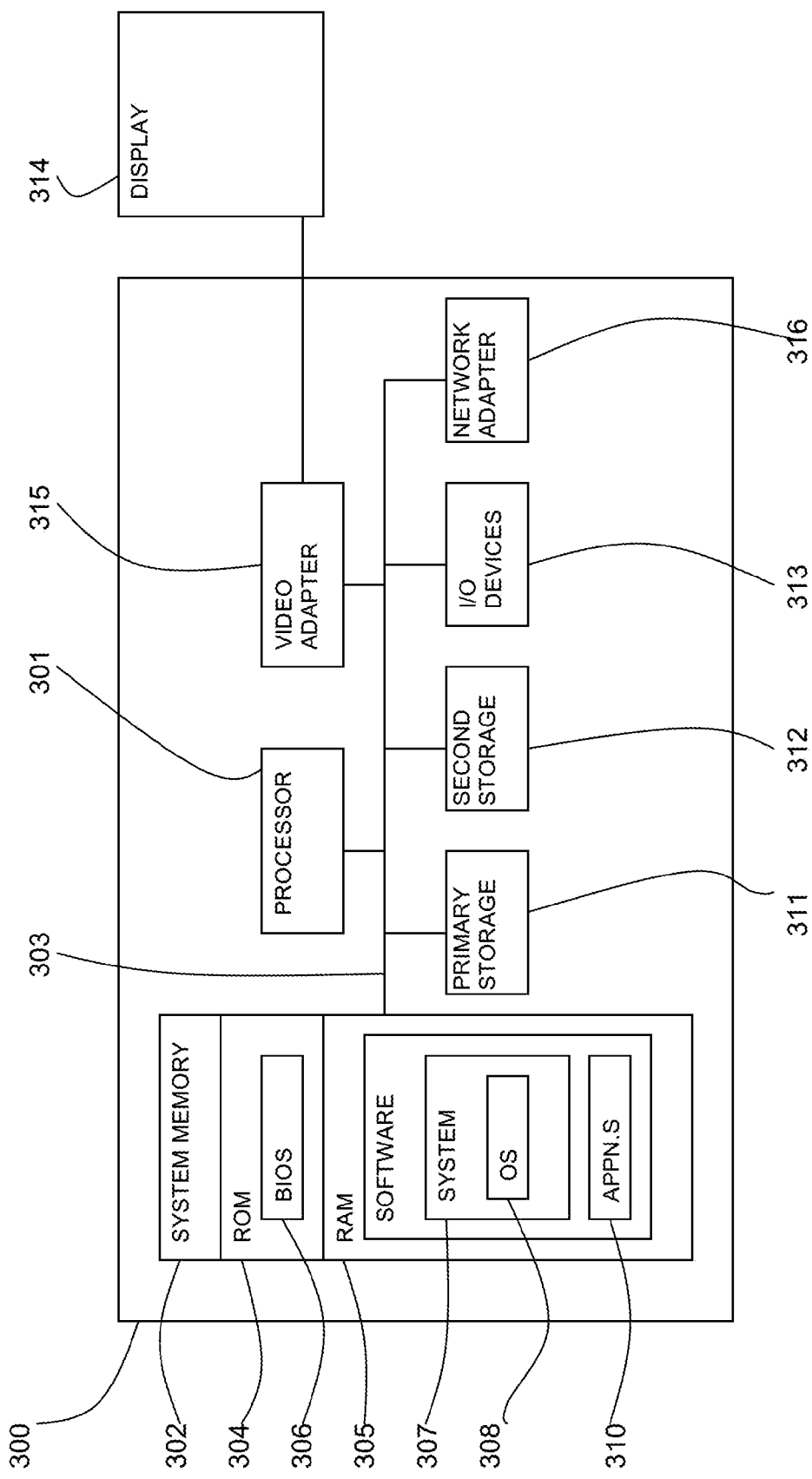

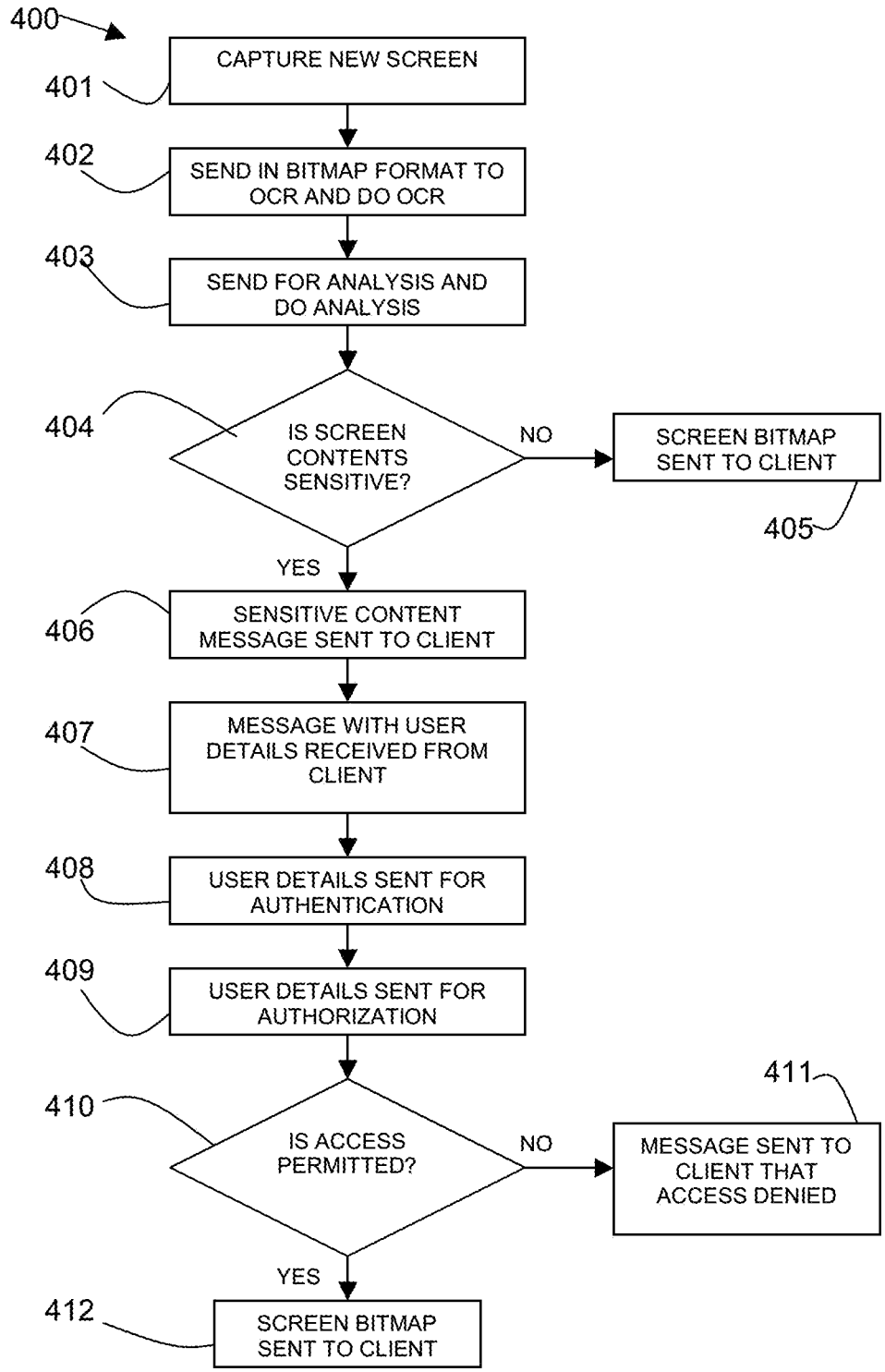

ACCESS CONTROL FOR SERVER APPLICATIONS

BACKGROUND

This invention relates to the field of access control. In particular, the invention relates to dynamic access control for server applications.

Legacy applications may be delivered to a user by application delivery software at a client system such as a terminal emulator, web browser or other application delivery product. A legacy application may have been written a while ago and over time the security and privacy requirements may have become stricter (for example, because of new legislation and regulations). It is often not possible to change the application, the database, or the database privileges to add access control capabilities.

For example, considering the following scenario, a legacy application may have been designed and written for one type user and, following new legislation and regulations, there may be users carrying specific roles that are not allowed to accesses some of the application screens. Fine grained access control capabilities need to be added without changing the application or the database.

Role Base Access Control (RBAC) is a technical means for controlling access to computer resources. Within an organization, roles are created for various job functions. The permissions to perform certain operations are assigned to specific roles. System users are assigned particular roles, and through those role assignments acquire the permissions to perform particular system functions or user particular resources. Since users are not assigned permissions directly, but only acquire them through their role(s), management of individual user rights becomes a matter of simply assigning appropriate roles to the user. The access control can be enforced on many levels, today most of the known databases support RBAC and, when needed, applications are written and modified to support it.

BRIEF SUMMARY

According to a first aspect of the present invention there is provided a method for access control for a server application provided between a server executing an application and a client, comprising: capturing a screen from the server application; determining if the screen includes sensitive content; checking a client user's authorization before sending a screen including sensitive content to the client; wherein said steps are implemented in either: computer hardware configured to perform said capturing, determining and checking steps, or computer software embodied in a non-transitory, tangible, computer-readable storage medium.

According to a second aspect of the present invention there is provided a computer program product for access control for a server application provided between a server executing an application and a client, the computer program product comprising: a computer readable storage medium having computer readable program code embodied therewith, the computer readable program code comprising: computer readable program code configured to: capture a screen from the server application; determine if the screen includes sensitive content; check a client user's authorization before sending a screen including sensitive content to the client.

According to a third aspect of the present invention there is provided a system for access control for a server application, comprising: a gateway system provided between a server executing an application and a client, including: a processor; a screen capture component for capturing a screen from the server application; a sensitive content component for determining if the screen includes sensitive content; an authorization component for checking a client user's authorization before sending a screen including sensitive content to the client.

According to a fourth aspect of the present invention there is provided a method of providing a service to a customer over a network for access control for a server application provided between a server executing an application and a client, the service comprising: capturing a screen from the server application; determining if the screen includes sensitive content; and checking a client user's authorization before sending a screen including sensitive content to the client.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 2A to 2E are schematic diagrams showing the system of FIG. 1 with flow steps illustrating aspects of the present invention;

FIG. 3 is a block diagram of a computer system in which the present invention may be implemented; and FIG. 4 is a flow diagram of a method in accordance with the present invention.

Figure 1:
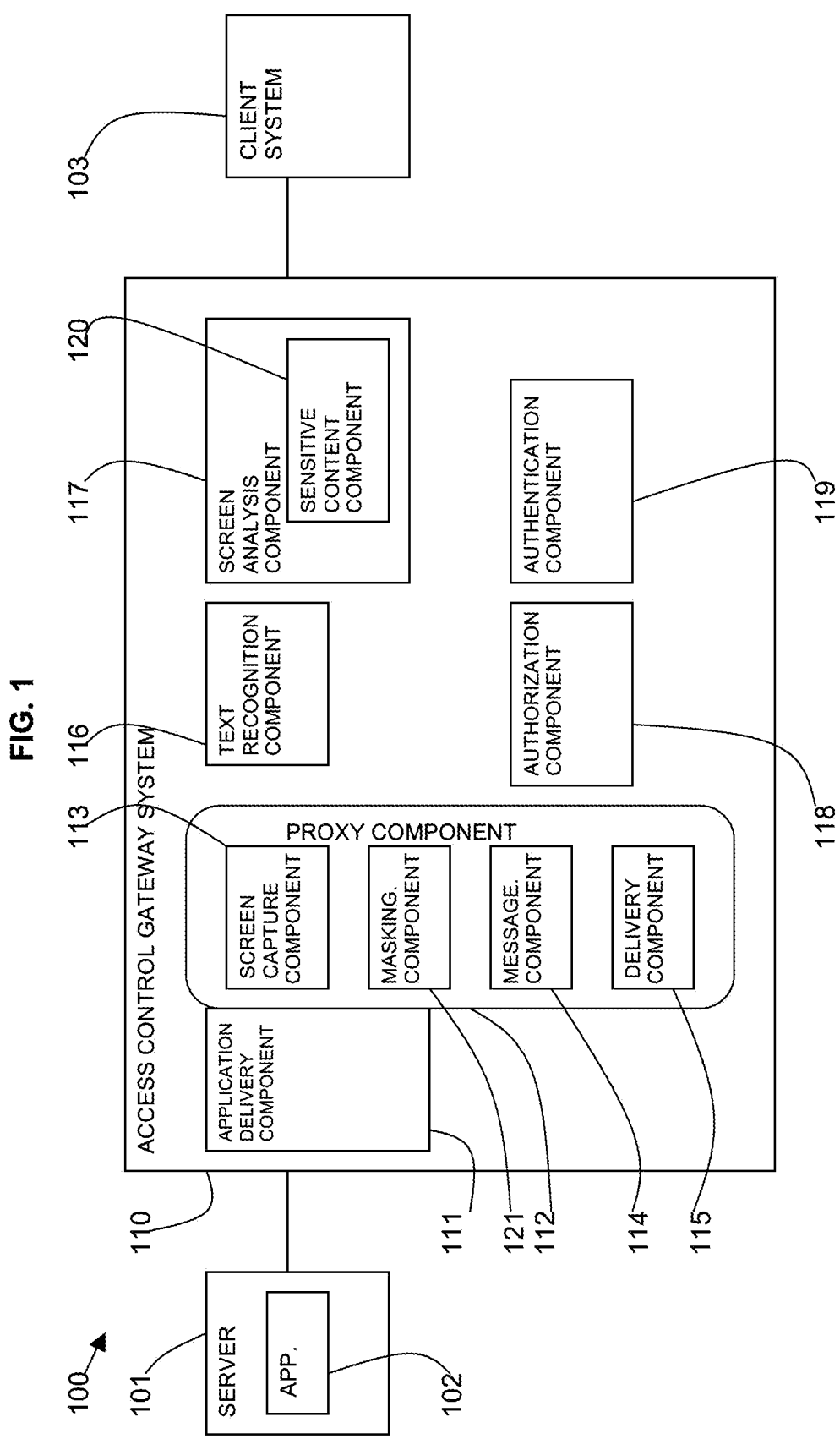
FIG. 1 is a block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described in which access control is provided for server-based applications by providing a gateway between a server and a client. The middle layer gateway is used to recognize and analyze a screen from the application to identify sensitive content for which authentication and authorization is required. Users are then authenticated and authorized by the gateway to provide access control for the application.

An access control gateway which runs on additional machines (additional to the server and the client) is added between a server that executes an application and the desktop. The application delivery software that originally runs on the desktop is moved to run on the gateway and the desktop is an executing dedicated client that actually presents the same screens as the application delivery software with some extra capabilities that will be described. The access control gateway is an application that screens bitmaps before they are presented to the end-users, analyzes the screen layout and content using OCR techniques, and identifies whether the screen that is going to be presented contains sensitive information (according to predefined rules). If sensitive information is detected, a login window is presented to the user asking the user to authenticate. The user details are passed to an authentication system to verify the user identity, and then to the authorization system to determine if the user has the privileges to access the information that appears in the screen going to be presented. Only then is the screen sent to the user.

If the access privileges exist, the screen is sent to the user, if not a message that says that the access was denied appears and the previous screen is sent again.

The main advantages of this approach are:

Adding additional access control capabilities without the need to change the application or the database.

Fine grain access control. By using the described method, access control can also be enforced on sub-screens by sending only part of the bitmap (for example, replacing a rectangle in the bitmap with the background color) and asking the user to authenticate before sending the entire screen.

By adding this external layer, additional auditing and monitoring can be gained on the accesses to sensitive information.

Referring to FIG. 1, a block diagram shows a system 100 including a server 101 on which an application 102 is executed and a client system 103 which is the end-point receiver of the application 102. The client system 103 receives and displays screens of the application 102 and sends back user actions.

The described system 100 includes an access control gateway system 110. The gateway system 110 may be deployed near the server 101, near the client system 103, or may be located anywhere in between.

The application delivery component 111 that usually runs on the end point client system 103 is moved to run on the gateway system 110. The application delivery component 111 executes with a proxy component 112.

The proxy component 112 is an additional software daemon which may catch the screen bitmaps from the application 102 with a screen capture component 113.

The proxy component 112 may deliver captured screens using a delivery component 115 to the right component according to messages it receives using a messaging component 114. The proxy component 112 may also include a masking component 121 for masking sensitive content in a screen for sending to a client before authorization to send sensitive content is obtained.

A text recognition component 116 may be provided in the gateway system 110 and may receive a screen bitmap from the proxy component 112 and using OCR techniques may extract the text phrases and their locations from the screen.

A screen analysis component 117 may receive the OCR results from the text recognition component and may analyze the extracted content to understand the content. The screen analysis component 117 may include a sensitive content component 120 to determine whether the extracted screen content contains sensitive information. This may be done by using a set of rules or by using screen IDs.

The gateway system 110 may also include an authentication component 119 which may verify that the user is who he said he his, and an authorization component 118 which may check what the user is entitled to do.

The components of the gateway system 110 such as the text recognition component 116, the screen analysis component 117, the authorization component 118, and the authentication component 119 may be provided remotely to the gateway system 110 and accessed via a network or other communication mechanism.

The gateway system 110 is not dependent on the application software that generates the screens, nor on the delivery mechanisms, and can thus practically work on all screen displays and user interface applications.

Referring to FIGS. 2A to 2E, the system 100 of FIG. 1A is illustrated with arrows showing a sequence of events which may be carried out by the gateway system 110.

Figure 2A:
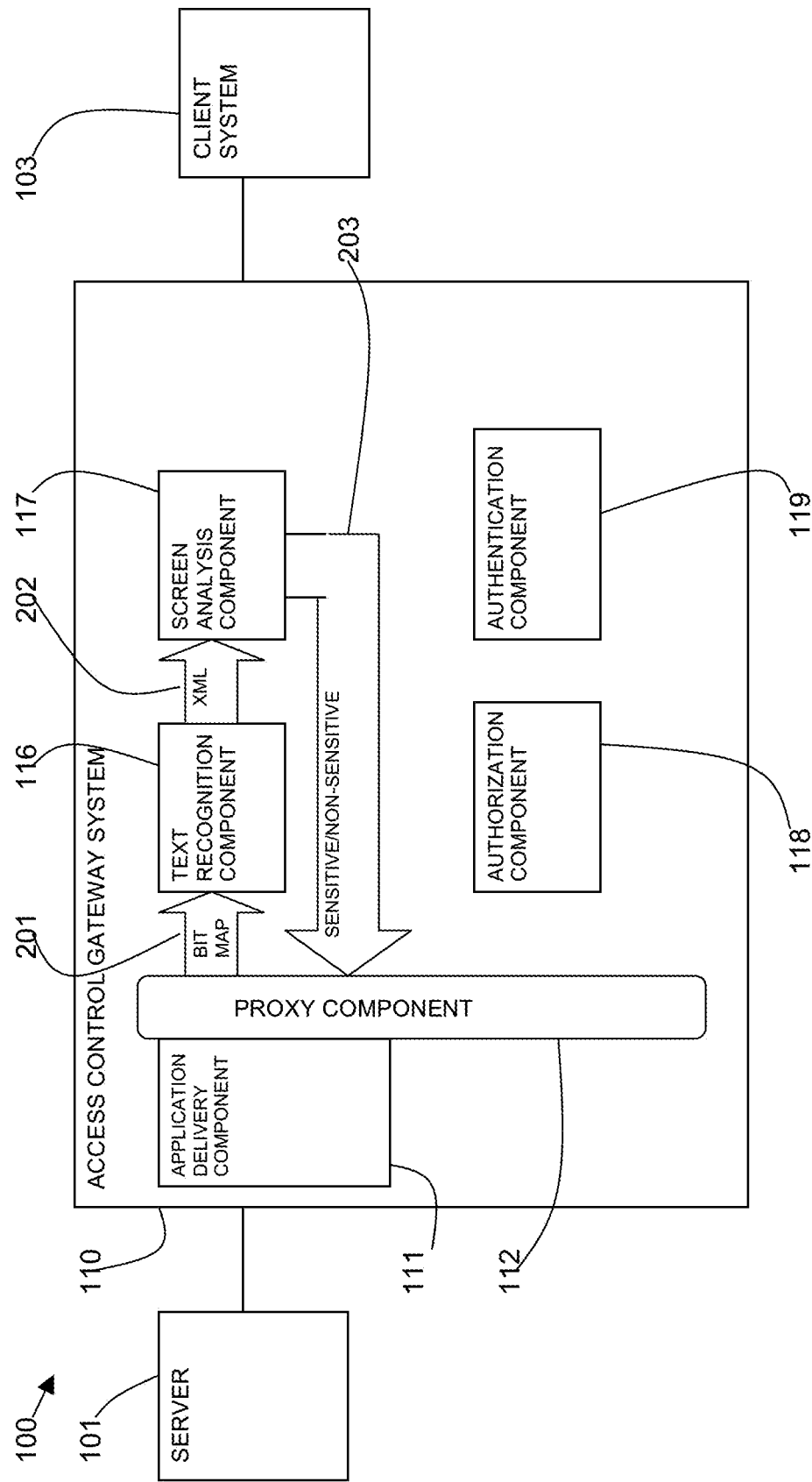

Referring to FIG. 2A, the proxy component 112 may capture a new screen when it is presented in the application delivery software 111 and may send 201 the screen in a bitmap format to the text recognition component 116.

The text recognition component 116 may carry out an OCR process on the bitmap and may send 202 a list of the text phrases together with information such as coordinates, size, color, and background color in an XML (Extensible Markup Language) format to the screen analysis component 117.

The screen analysis component 117 may determine if the screen contains sensitive information. The information on the sensitivity may be defined as a set of rules or by a confinable list of screen IDs.

A method may be used to identify sensitive screens, by automatically identifying screens based on their images, according to their layout and the constant texts that appear on them. The method is based on performing OCR on the screen image and analysis to discover its layout (e.g. titles, labels, tables, forms, etc.), extraction of the constant texts in each of the discovered GUI constructs (e.g. table column headers), creation of a screen identification string and computation of a hash value based on that string. The method can also be enhanced by additional user-defined configuration and hints.

From each screen in the application, the list of GUI constructs, such as titles, buttons, forms, tables, etc., which appear on it is extracted. Then, an identifying string is assembled from the collection of all of the GUI constructs' types (i.e. "table") with the texts that appear in the constant parts (i.e. the label in a labeled field, the column headers in a table, and so on). This string is then used to compute a CRC (cyclic redundancy check) value (a long integer), which serves as the screen's unique ID in the system. In this way, all screens that have the same structure are mapped to a single ID, regardless of varying content in the forms and tables, and without the need to receive any formatted information from the application itself.

A message indicating whether the screen is sensitive or not may be sent 203 from the screen analysis component 117 to the proxy component 112.

Referring to FIG. 2B, if a message saying that no sensitive information is found is sent 203 to the proxy component 112, the proxy component 112 may send 204 the screen bitmap to the client system 103.

Referring to FIG. 2C, if a message saying that the screen contains sensitive information is sent 203 to the proxy component 112, the proxy component 112 may send 205 a message to the client system 103 to indicate that the access to that screen is restricted. Alternatively, the proxy component 112 may mask the sensitive content in the screen and send the screen with masking to the client.

The client system 103 may raise a message asking for some details, for example, user ID and Password. Justification of why he/she needs to access the sensitive information may also be requested, for example, for auditing purposes.

The user details may be sent 206 to the authentication component 119 where the identity of the user is verified. The user ID may then be sent 207 to the authorization component 118 that checks if the user has the privileges to access to data on the screen. The output of the authorization component 118 may be a message 208 to the proxy component 112 relaying a decision indicating whether the access is permitted or denied. Any existing authentication and authorization component may be used. Individual authorization or role authorization may be used.

Figure 2D:
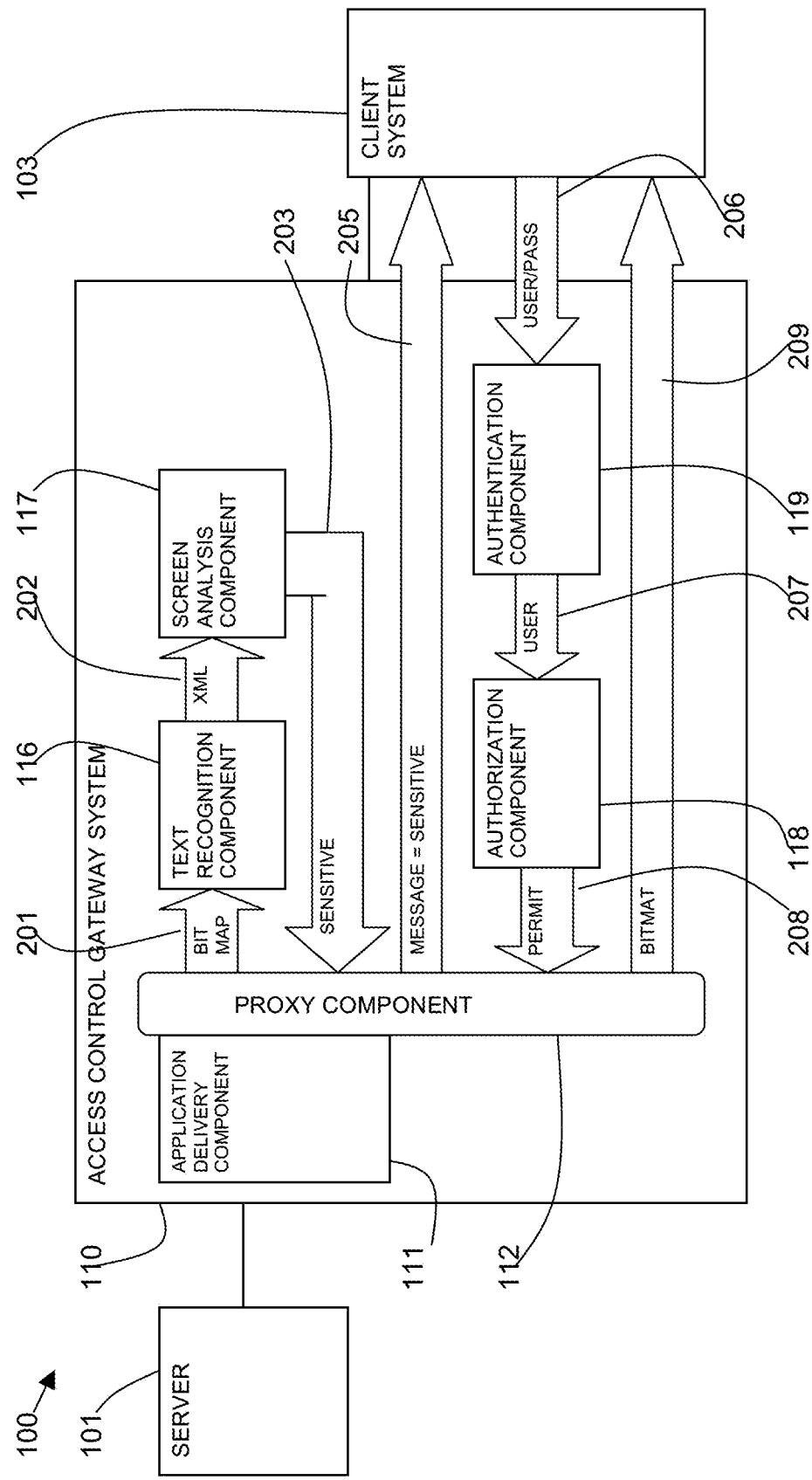

Referring to FIG. 2D, if the authorization component 118 permits access to the user, the proxy component 118 may send 209 the screen bitmap to the client system 103. The client system may present the screen to the user.

Figure 2E:
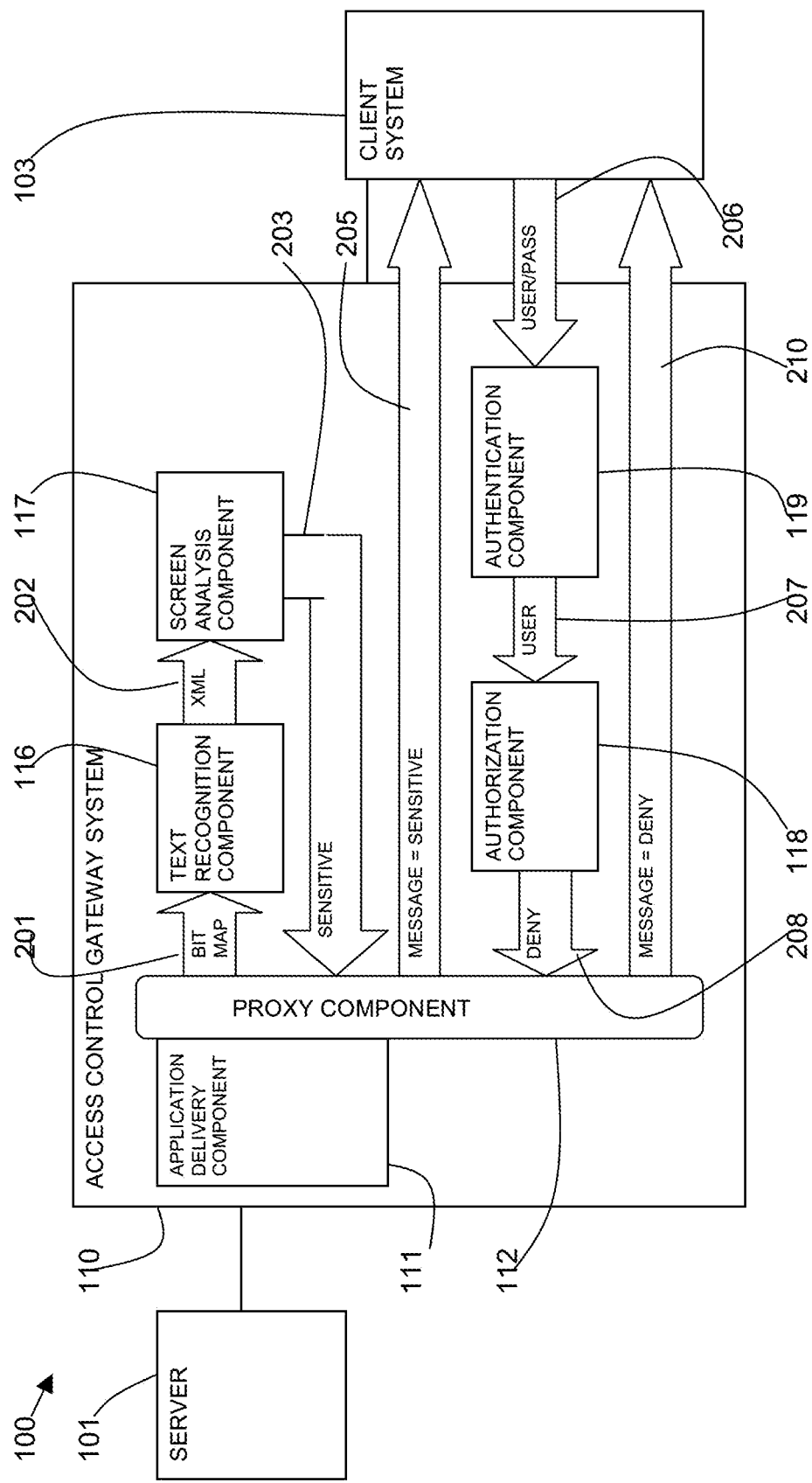

Referring to FIG. 2E, if the authorization component 118 denies access to the user, the proxy component 112 may send 210 a message to the client system 103 that the access was denied. The client system 103 may raise a window with a message and, when accepted, the previous screen may be presented to the user.

Referring to FIG. 3, an exemplary system for implementing aspects of the invention such as the access control gateway system include a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Referring to FIG. 4, a flow diagram 400 shows an embodiment of the described method as carried out at an access control gateway system.

A new screen from a server based application may be captured 401 and sent 402 in bitmap format for text recognition. The capturing may include obtaining pixel information, retrieving bitmaps, snooping or otherwise monitoring exchange of information that represents at least a portion of an image of a page, a form or another object that includes textual characters.

Text recognition may be carried out and the output of the text recognition may be sent 403 for analysis. The analysis of the screen content as derived from the text recognition may determine 404 if the screen contents are sensitive or not. If it is determined 404 that the screen contents are not sensitive, the screen bitmap may be sent 405 to the client.

If it is determined that the screen contents are sensitive, a message may be sent 406 to the client. The user details, for example, a user ID and password, may be received 407 and the user details may be sent 408 for authentication. Once authenticated, the user identity may be sent 409 for authorization. The authorization determines 410 if access is permitted. If it is not permitted, a message may be sent 411 to the client that access is denied.

If the authorization determines 410 that access is permitted, the screen bitmap may be sent 412 to the client.

By using the described method, access control may also be enforced on sub-screens by sending only part of the bitmap (for example, replacing a rectangle in the bitmap with the background color) and asking the user to authenticate before sending the entire screen. When the sensitive information is detected by the screen analysis component in only a specific location in the screen and the rest of the screen contain useful information, the method may remove the sensitive information by replacing the specific area in the bitmap with other pixels (e.g. black). The masked screen may be sent to the user. Then, if and when the user is authenticated as having the authority to see the data, the whole information may be sent, The role hierarchy and the authentication (verifying that the user is who he said he is) and authorization (determining who can do what) systems may already exist and are accessed by the described access control gateway system.

The described method and system offer a way to enforce Role Base Access Control (RBAC) over existing application without changing the application and the database access control schema. Furthermore, database support and redesign and change of the application are not needed.

Using the described method and system access control can be added to any application delivered by application delivery software like mainframe applications that are delivered by terminal emulators, as well as client/server or web applications.

The described method and system looks at what is going to be presented to the user by the client system and checks whether it contains information that the user should not be allowed to see. Therefore, it is not concerned with where the data comes from or how, but only what is in a screen to be viewed.

Access control for server applications may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for access control for a server application provided between a server executing an application and a client, comprising:

receiving, from a server application, by an application delivery software installed on a gateway, data of a legacy application, for display to a client;

converting the received data into a screen image for display to the client, by the application delivery software on the gateway;

determining, by a proxy component on the gateway, a screen identifier of the image, by analyzing visual content of the image;

comparing the screen identifier to a list of screen IDs to determine whether the image includes sensitive content, the determining including carrying out text recognition on the screen content and analyzing the output of the text recognition to identify sensitive content; and checking a client user's authorization before sending a screen image determined as including sensitive content to the client.

2. The method as claimed in claim 1, including providing access control for a sub-screen including:

sending a screen to a client with sensitive content masked; and checking a client user's authorization before sending the sensitive content.

3. The method as claimed in claim 1, wherein access control is added to the server application without changing the application or any database access by the server application.

4. The method of claim 1, wherein receiving data for display to the client comprises receiving by a client application delivery software designed for operation with the server application on the client, executed by the gateway.

5. The method of claim 1, comprising modifying the screen image and transmitting the modified screen image to the client, if the client user authorization was not properly authenticated.

6. The method of claim 1, wherein determining if the image of the screen includes sensitive content comprises applying OCR to text in the screen image.

7. The method of claim 1, wherein determining if the image of the screen includes sensitive content comprises determining titles or table headers in the screen image.

8. The method of claim 1, wherein determining if the image of the screen includes sensitive content comprises determining based on text size or text color of text in the screen image.

9. The method of claim 1, wherein determining if the image of the screen includes sensitive content comprises determining based on a background color of the screen image.

10. The method of claim 1, wherein determining if the image of the screen includes sensitive content comprises determining based on coordinates of features in the screen image.

11. The method of claim 1, wherein the application delivery software comprises a terminal emulator or a web browser.

12. The method of claim 1, wherein analyzing visual content of the image of the screen to determine a screen identifier comprises performing OCR on the screen image.

13. The method of claim 1, wherein analyzing visual content of the image of the screen to determine a screen identifier comprises creation of a screen identification string and computation of a hash value based on the string.

14. A computer program product for access control for a server application provided between a server executing an application and a client, the computer program product comprising:

a non-transitory computer readable storage medium having computer readable program code embodied therewith, the computer readable program code comprising:

an application delivery software computer readable program code configured to cause a gateway to:

receive, from a server application, data of a legacy application, for display to a client; and convert the received data into a screen image for display to the client; and a proxy component program code configured to cause the gateway to:

determine a screen identifier of the screen image, by analyzing visual content of the image;

compare the screen identifier to a list of screen IDs to determine whether the image includes sensitive content, the determining including carrying out text recognition on the screen content and analyzing the output of the text recognition to identify sensitive content; and check a client user's authorization before sending a screen image determined as including sensitive content to the client.

15. A system for access control for a server application, comprising:

a gateway system provided between a server executing an application and a client, including:

a processor configured to receive from a server application, by an application delivery software installed on the gateway, data of a legacy application, for display to a client, to convert the received data into a screen image for display to the client, by the application delivery software on the gateway, to determine, by a proxy component on the gateway, a screen identifier of the screen image, by analyzing visual content of the image, compare the screen identifier to a list of screen IDs to determine whether the image includes sensitive content, the determining including carrying out text recognition on the screen content and analyzing the output of the text recognition to identify sensitive content; and to check a client user's authorization before sending a screen image including sensitive content to the client.

16. The system as claimed in claim 15, wherein the gateway system runs an application delivery component that is designed to run on a client desktop and wherein the gateway is configured to transmit the screen image to an executing dedicated client.

17. The system as claimed in claim 15, wherein the processor is configured to identify screen identifiers.

18. The system as claimed in claim 15, including an authenticating component for authenticating a client user's identity.

19. The system as claimed in claim 15, including:

a masking component for masking sensitive content in a screen to be sent to the client.

20. The system as claimed in claim 15, wherein access control is added to the server application without changing the application or any database access by the server application.

* * * * *